(12) United States Patent
Amaya-Benitez et al.

(10) Patent No.: US 11,196,982 B2
(45) Date of Patent: Dec. 7, 2021

(54) TIME-OF-FLIGHT CAMERA, ELECTRONIC DEVICE AND CALIBRATION METHOD

(71) Applicant: Sony Semiconductor Solutions Corporation, Kanagawa (JP)

(72) Inventors: Manuel Amaya-Benitez, Stuttgart (DE); Ward Van Der Tempel, Stuttgart (DE); Ye Chen, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/509,932

(22) Filed: Jul. 12, 2019

(65) Prior Publication Data

US 2020/0021792 A1 Jan. 16, 2020

(30) Foreign Application Priority Data

Jul. 13, 2018 (EP) .................................... 18183564

(51) Int. Cl.
| | | |
|---|---|---|
| *H04N 13/246* | (2018.01) | |
| *G01S 17/02* | (2020.01) | |
| *G01S 17/89* | (2020.01) | |
| *H04N 13/25* | (2018.01) | |
| *H04N 13/271* | (2018.01) | |
| *G01S 7/481* | (2006.01) | |
| *H04N 13/00* | (2018.01) | |

(52) U.S. Cl.
CPC .......... *H04N 13/246* (2018.05); *G01S 7/4818* (2013.01); *G01S 17/02* (2013.01); *G01S 17/89* (2013.01); *H04N 13/25* (2018.05); *H04N 13/271* (2018.05); *H04N 2013/0081* (2013.01)

(58) Field of Classification Search
CPC .... H04N 13/246; H04N 13/271; H04N 13/25; G01S 7/4818; G01S 17/02; G01S 17/89

USPC ........................................................... 348/46
See application file for complete search history.

(56) References Cited

U.S. PATENT DOCUMENTS

| | | | |
|---|---|---|---|
| 9,330,464 B1 | 5/2016 | Ackerman et al. | |
| 9,674,504 B1* | 6/2017 | Salvagnini et al. | ......................... H04N 13/0246 348/148 |
| 9,681,123 B2 | 6/2017 | Perry et al. | |
| 2015/0062558 A1* | 3/2015 | Koppal | ................... G01S 17/89 356/5.01 |

(Continued)

FOREIGN PATENT DOCUMENTS

| | | |
|---|---|---|
| CN | 102572505 B | 11/2014 |
| KR | 20110052993 A | 5/2011 |
| KR | 101626072 B1 | 6/2016 |

OTHER PUBLICATIONS

Seiter et al., Correction of a phase dependent error in a time-of-flight range sensor. Proc. of SPIE 2013. vol. 8791. doi: 10.1117/12.2020493.

*Primary Examiner* — Nguyen T Truong
(74) *Attorney, Agent, or Firm* — Wolf, Greenfield & Sacks, P.C.

(57) ABSTRACT

A time-of-flight camera has:
  a light source for emitting light;
  a first imaging sensor; and
  a controller configured to perform a time-of-flight measurement calibration based on determining at least one of a cyclic error and an offset error by detecting light emitted from the light source with a second imaging sensor, wherein a predetermined optical path is provided between the light source and the second imaging sensor.

17 Claims, 15 Drawing Sheets

(56) References Cited

U.S. PATENT DOCUMENTS

2017/0180703 A1* 6/2017 Kovacovsky ........... G01S 17/46
2017/0212220 A1* 7/2017 Dahlmann et al. ... G01S 7/4815
356/4.01

* cited by examiner

TIME-OF-FLIGHT CAMERA, ELECTRONIC DEVICE AND CALIBRATION METHOD

CROSS REFERENCE TO RELATED APPLICATIONS

The present application claims priority to European Patent Application 18183564.6 filed by the European Patent Office on Jul. 13, 2018, the entire contents of which being incorporated herein by reference.

TECHNICAL FIELD

The present disclosure generally pertains to time-of-flight cameras, an electronic device including such a time-of-flight camera and a calibration method for a time-of-flight camera.

TECHNICAL BACKGROUND

Generally, time-of-flight (ToF) technology is known which includes a variety of methods that measure the time that a light needs for traveling a distance in a medium, such that the distance can be determined.

For instance, a ToF camera, typically, illuminates a scene with a modulated wave and images the backscattered wave, e.g. with a sensor array and by applying a modulated gain.

Additionally, indirect time-of-flight (iToF) cameras are known, which calculate a delay between emitted light and backscattered light by determining a phase shift between the emitted light and the backscattered light.

For iToF cameras, it is known that a cyclic error and an offset error of depth measurements may occur, wherein such errors may be eliminated by applying a suitable calibration.

A known calibration method for a time-of-flight (TOF) camera is, for example, off-line phase shift, which is typically accurate under lab condition, but insensitive to process, voltage, or temperature change.

Although there exist techniques for calibration of a time-of-flight cameras it is generally desirable to provide a time-of-flight camera, an electronic device with a time-of-flight camera and a calibration method for a time-of-flight camera.

SUMMARY

According to a first aspect, the disclosure provides a time-of-flight camera, comprising a light source for emitting light; a first imaging sensor; and a controller configured to perform a time-of-flight measurement calibration based on determining at least one of a cyclic error and an offset error by detecting light emitted from the light source with a second imaging sensor, wherein a predetermined optical path is provided between the light source and the second imaging sensor.

According to a second aspect, the disclosure provides an electronic device comprising a time-of-flight camera, the time-of-flight camera including a light source for emitting light; a first imaging sensor; and a controller configured to perform a time-of-flight measurement calibration based on determining at least one of a cyclic error and an offset error by detecting light emitted from the light source with a second imaging sensor, wherein a predetermined optical path is provided between the light source and the second imaging sensor.

According to a third aspect, the disclosure provides a calibration method for a time-of-flight camera, the time-of-flight camera including a light source for emitting light and a first imaging sensor, the method comprising performing a time-of-flight measurement calibration based on determining at least one of a cyclic error and an offset error by detecting light emitted from the light source with a second imaging sensor, wherein a predetermined optical path is provided between the light source and the second imaging sensor.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 4:
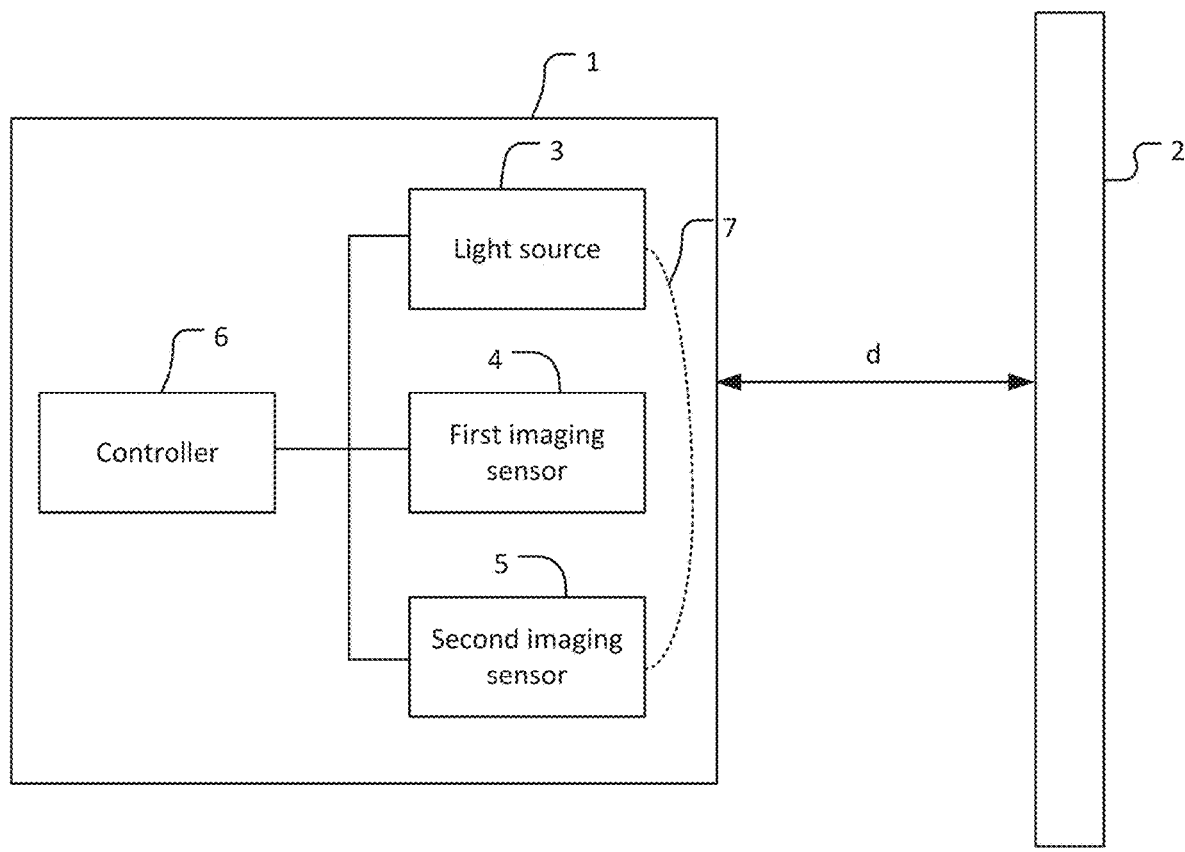
FIG. 4 illustrates a first embodiment of a ToF camera for determining a distance to a scene.

Before a detailed description of a first embodiment of the present disclosure under reference of FIG. 4 is given, general explanations are made.

As mentioned in the outset, time-of-flight (ToF) is known to include a variety of methods that measure the time that a light needs for traveling a distance in a medium, such that the distance can be determined, e.g. by determining a phase shift as also discussed further below, and as is done, for example, in indirect time-of-flight (iToF) cameras, which, in some embodiments, calculate a delay between emitted light and backscattered light for obtaining depth measurements by sampling a correlation wave, e.g. between a modulation signal for driving a light source, an image sensor, or the like, with signal obtained based on backscattered light.

Generally, in some embodiments, the delay is obtained in the frequency domain which, in turn, is obtained by applying a Fourier transformation on correlation wave, wherein the correlation wave is obtained, for example, by performing a cross correlation between the modulation signal and the signal obtained based on the backscattered light.

In some embodiments, generally, the distance is obtained from the phase of the first harmonic of the correlation wave, since the first harmonic, typically, has the highest amplitude. Of course, in some embodiments, more than one and other than the first harmonics may be used for determining the distance between the time-of-flight camera and the scene.

However, frequency aliasing, which is a well-known effect that appears when a signal is sampled at less than the double of the highest frequency contained in the signal (Nyquist-Shannon theorem), may occur.

For example, for (indirect) ToF cameras, the frequency aliasing may result in a cyclic error of the depth or distance measurements, such that, in some embodiments, a calibration of the ToF camera may be needed. Furthermore, in some embodiments, additionally or alternatively a global offset error may occur, e.g. resulting in a constant depth error, which may also need calibration.

It is known that (i)ToF cameras are calibrated once before they are going to be deliver to customer, but it has been recognized that cyclic error and global offset error calibration per module is time consuming, and, thus, dominant in calibration cost. Additionally, these errors, typically, may depend on the temperature, the aging of the hardware and any possible change (e.g. voltage supply) in the ToF camera, which may result in a variation of generated signals, such an initial calibration may be invalidated.

It has been recognized that a useful calibration may be provided by implementing, in addition to a (main) first image sensor, a second image sensor and a predetermined optical path which is used for detecting light with the second image sensor, while the main sensor is used for determining a distance between a ToF camera and a scene.

Thus, some embodiments pertain to a time-of-flight camera, including a light source for emitting light; a first imaging sensor; and a controller configured to perform a time-of-flight measurement calibration based on determining at least one of a cyclic error and an offset error by detecting light emitted from the light source with a second imaging sensor, wherein a predetermined optical path is provided between the light source and the second imaging sensor.

In some embodiments, the ToF camera is to be understood functionally, and, for instance, it can be integrated in another electronic device, such as a computer, smartphone, mobile phone, laptop, digital (still/video) camera, etc. In other embodiments, the ToF camera may also be a standalone device including, for example, a housing, a user interface for operating the ToF camera, and the like.

The light source may be any type of illumination device, which is capable to modulate at least one of a frequency and phase of a light and may include, for example, one or more light emitting diodes, one or more laser elements (e.g. vertical-cavity surface emitting lasers), or the like.

The light source may be within a housing of the ToF camera, but in some embodiments, it is located outside the housing of the ToF camera or it may also be included in the electronic device in which the ToF camera is located.

The first and/or the second image sensor may include one or more pixels, which may be arranged in a pixel array. Each pixel may include one or more photosensitive elements (e.g. photodiodes or the like). Typically, a photosensitive element converts incident light into light signal, which may be digitized by an analog-to-digital converter. The first and/or the second image sensor may be based on CMOS (Complementary metal-oxide-semiconductor) technology, CCD (Charge-coupled device) technology, or any other suitable imaging technology.

The second sensor may be outside of the ToF camera and imaging data may be received, e.g. over an interface of the controller or the like (e.g. per universal serial bus connection, per network (e.g. wireless and/or wired connection), over the internet, etc.). The second imaging sensor may also be or include a photodetector.

The controller may include one or more processors, transistors, a (e.g. general purpose) computer, memory, interfaces, etc.

As mentioned, the controller performs the time-of-flight measurement calibration based on determining at least one of the cyclic error and the offset error. This is performed by detecting light emitted from the light source with the second image sensor, wherein the light emitted from the light source travels over the predetermined optical path between the light source and the second image sensor. In some embodiments, only light traveling on the predetermined light source is detected by the second image sensor. By applying the predetermined optical path, a distance between the second image sensor and the light source is known, since the optical path is predetermined and, thus, is not changed during detection of the light traveling over the predetermined optical path. Hence, in some embodiments, the predetermined optical path is fixed (at least during detection of the light by the second image sensor).

By using the predetermined optical path, at least one of the cyclic and the offset error can be determined and the determined error can be used for performing the on-the-flight measurement calibration, such that the cyclic and/or offset error which would be introduced by measuring a distance with the first imaging sensor can be corrected or, in some embodiments, avoided based on the flight measurement calibration.

In some embodiments, the light source is modulated with a modulation signal which is also used for reading out the first and second image sensor, as it is generally known. The modulation signal may introduce a phase shift into the emitted light and this phase shift is also used for controlling the readout of the first and second image sensors. For instance, four phase shifts may be used in some embodiments, without limiting the present disclosure in that regard and other embodiments, may use less phase shifts, e.g. two or three, or more phase shifts, e.g. five, six, seven, eight, etc., as is generally known to the skilled person.

Figure 1:
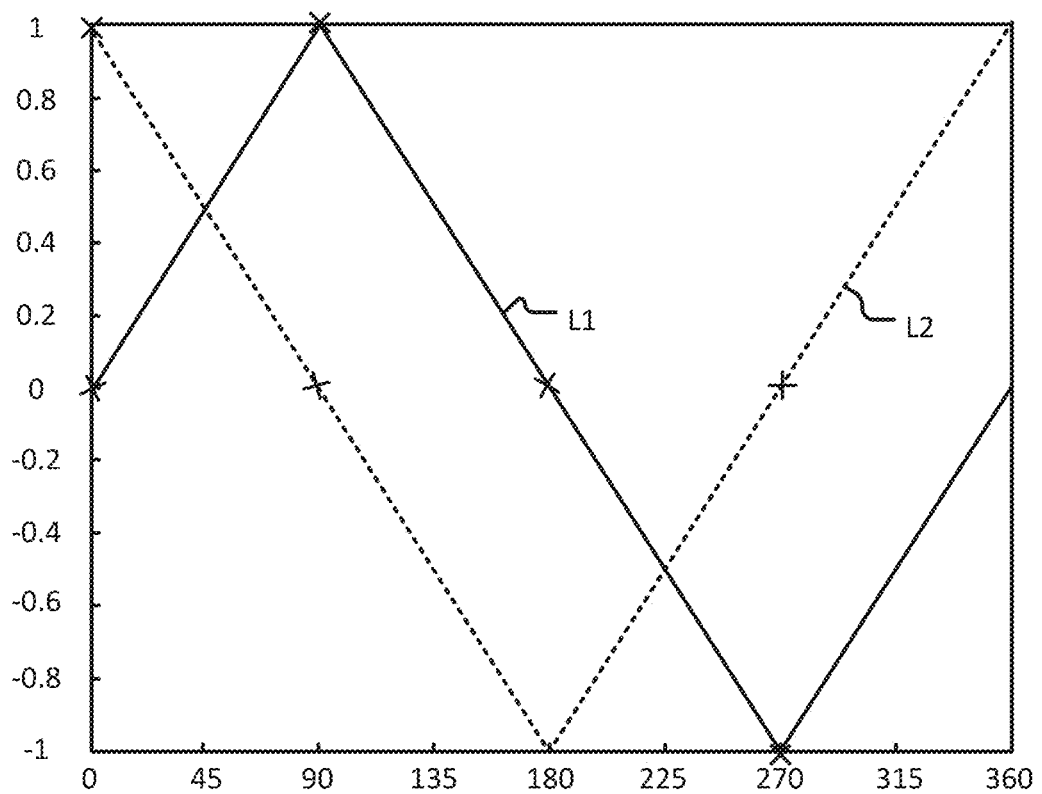
FIG. 1 shows a first curve which represents a correlation waveform for a first distance and a dotted curve which represents a correlation waveform for the second distance.

FIG. 1 schematically illustrates an embodiment where four phase shifts are used. The modulation signal is cross correlated with a signal obtained by detecting the backscatter light, e.g. with the first or with the second imaging sensor, thereby obtaining a correlation waveform. Of course, the present disclosure is not limited in that regard and, as mentioned, another number of phase shift can be used.

FIG. 1 shows on the abscissa a phase angle and on the ordinate the normalized cross-correlation value from −1 (maximum non-correlated) to 1 (maximum correlated). A first curve L1 represents a correlation waveform for a first distance and the dotted curve L2 represents a correlation waveform for the second distance. The delay between the emitted light and the scattered light, which is used for calculating the distance to the scene, corresponds to the phase of the correlation waveform.

As mentioned, in some embodiments, a predetermined number of phase shifts is implemented, as a number of four as illustrated in FIG. 1, such that four samples at phases 0°, 90°, 180° and 360° marked with "X" can be taken (of course other phase shifts and other number of phase shifts can be implemented, as mentioned). Each sample is obtained by applying the corresponding phase shift (0°, 90°, 180° and 360°) between the illumination and the pixel-mixing signal (demodulation signal).

Hence, in some embodiments, only a limited number of sample points of the correlation waveform (e.g. L1 and L2 in FIG. 1) is known (namely four in FIG. 1), wherein the number of sample points may correspond to the number of phase shifts in some embodiments.

For determining the measured distance which is associated with the phase shift, in some embodiments, a (fast forward) Fourier transformation is performed for the correlation waveform and, e.g. the first harmonic of the obtained Fourier transformed function is used, since the phase (shift) of the first harmonic corresponds to the measured distance.

Figure 2A:
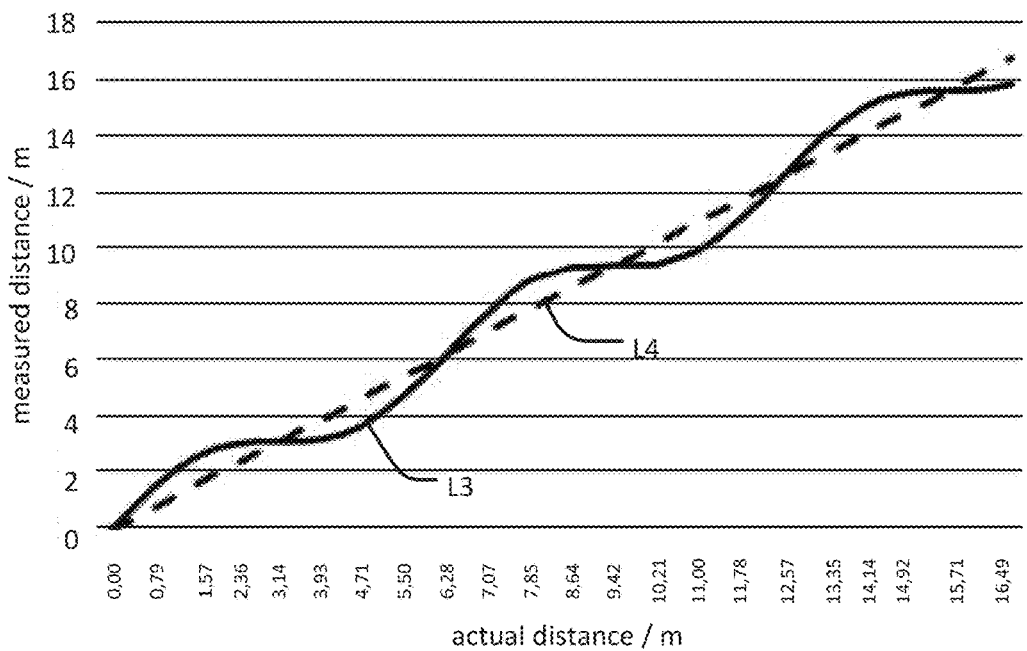
FIG. 2a shows a measured distance on the ordinate and an actual distance on the abscissa of the ToF camera, wherein a dashed line represents an ideal case and a curved line represents a case with a cyclic error.

However, as discussed, as the correlation waveform is only sampled with a few points, e.g. four (or 2, 3, 5, 6, 7, 8 etc., as mentioned), the Nyquist-Shannon theorem mentioned above may apply in some embodiments, which, in turn, causes the cyclic error, as exemplary illustrated as curve L3 in FIG. 2a, which shows a measured distance on the ordinate and an actual distance on the abscissa. In order to determine such a kind of cyclic error, in some embodiments, the correlation waveform is measured at multiple phase resulting as the dashed line L4 in FIG. 2a, for which no cyclic error occurs, since in this case the Nyquist-Shannon theorem does not influence the measurement as in the case of L3.

Of course, in other embodiments, another number and/or other harmonics may be selected for determining the distance.

Thus, in some embodiments, the cyclic error for the predetermined optical path and a distance between the ToF camera (or first imaging sensor) and a scene is assumed to be (nearly) identical. The same applies, in some embodiments, for the offset error, an example of which is illustrated in FIG. 2b.

Figure 2B:
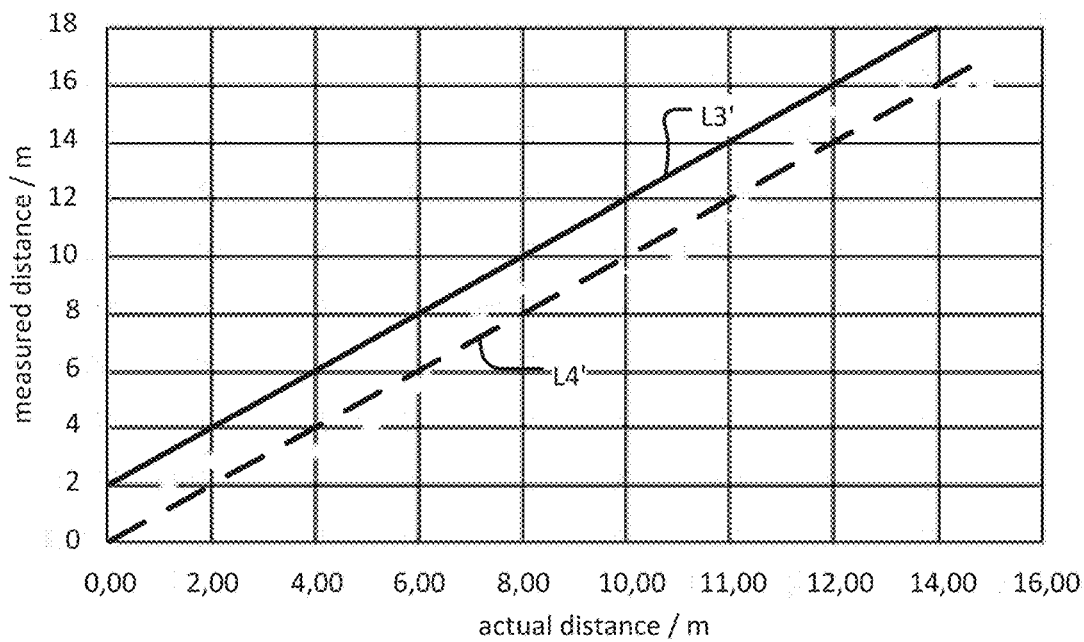
FIG. 2b shows a measured distance on the ordinate and an actual distance on the abscissa of the ToF camera, wherein a dashed line represents an ideal case and a straight line represents a case with an offset error.

FIG. 2b shows a measured distanced on the ordinate and an actual distance on the abscissae (for illustration purposes, the cyclic error is removed in this FIG. 2b). The ideal curve L4' is illustrated by a dashed-lined, wherein the measured curve L3' is vertically shifted by an (global) offset.

Hence, by determining the cyclic error and/or offset error for the predetermined optical path measurement, the cyclic and/or offset error may be removed for the distance measurement.

In some embodiments, the fact is used that the phase shift varies linearly with the distance measured. Hence, in such embodiments, the cyclic error may be a cyclic variation from the linear association between phase and distance (see also FIG. 2a explained above).

The determined cyclic and/or offset error may be stored, e.g. as calibration values in a look-up table, such that the calibration values can be used for calibration at any time.

In some embodiments, the first imaging sensor and the second imaging sensor rely on the same sensing technology, in order to ensure that they introduced a similar offset error, such that an offset error determined for the second imaging sensor may be transferred to the first imaging sensor. In other embodiments, different technologies may be used, and a transfer function may be applied for transferring the offset error from the second imaging sensor to the first imaging sensor. The transfer function and the determined offset error values may also be stored, e.g. in the look-up table.

The time-of-flight measurement calibration may be performed in real time and/or simultaneously while measuring a distance to a scene. In some embodiments, the time-of-flight measurement calibration may be performed before or after measuring a distance to the scene, e.g. immediately after or starting during the measurement.

Hence, in some embodiments, it is possible to perform a calibration of a global offset and/or a cyclic error in real time, and the necessity of pre-calibration may be removed, which may save camera production cost. Moreover, the temperature, process, supply voltage, aging dependence of the camera distance measurement may be removed, such that the calibration of the camera may stay valid.

In some embodiments, the ToF camera further includes the second imaging sensor. The second image sensor may be integrated in the ToF camera, it might be located adjacent to the first imaging sensor, it may be a part (subarea, sub-pixel, etc.) of the first imaging sensor or may be on the same substrate, it may be on the same die as the first imaging sensor, etc.

The second imaging sensor may have a smaller resolution, e.g. smaller number of pixels, as the first imaging sensor. Thus, the second imaging sensor may be cheaper and/or faster in some embodiments.

In some embodiments, the ToF camera includes the predetermined optical path. The predetermined optical path may be integrated in the ToF camera, may be fix installed, or the like. In some embodiments, the light emitted from the light source is directly detected by the second imaging sensor, wherein in other embodiments the light is indirectly detected by the second imaging sensor (e.g. by at least one reflection). For instance, the predetermined optical path includes a reflector, an optical fiber or any other optical means for guiding the light emitted from the light source to the second imaging sensor. In some embodiments, the reflector belongs to the whole ToF camera (e.g. part of the laser casing), while in other embodiments a reflector is used which does not belong to the camera (e.g. an external surface). In this way, the transfer function of the ToF system may be sampled by the second imaging sensor, as discussed. Thereby, in some embodiments, a predefined amount of light emitted from the light source can be guided to the second imaging sensor. Moreover, the predetermined optical path can have any type of form and, thus, can be simply integrated in the ToF camera (e.g. in the housing).

In some embodiments, the controller is further configured to image a scene with the first imaging sensor and simultaneously perform the time-of-flight measurement calibration. The term simultaneously may include embodiments where the time of the measurement performed by the first and by the second imaging sensor only partially overlaps. Moreover, embodiments, where the measurements are done in a serial fashion, e.g. alternating, may also be covered.

Hence, in some embodiments, the cyclic error and/or the offset error are determined during the distance measurement performed with the first imaging sensor, such that a real time calibration may be performed in some embodiments.

In some embodiments, the controller is further configured to vary a phase during detecting light emitted from the light source with the second imaging sensor and the ToF camera may further include a divider configured to vary the phase. Hence, in some embodiments, the divider further divides the phase into multiple phase shifts. This is done, in some embodiments, by sweeping (varying) the phase of the mixing (gating) signal (which is used for readout of the second (and also of the first) imaging sensor and which is used to modulate the pixel response for the distance measurement. By this way, in some embodiments, the correlation waveform is sampled at multiple phases (and not only at four as illustrated in FIG. 1). Based on this data, a Fourier transformation can be applied and, thus, different harmonics of the correlation waveform may be obtained, as also discussed above. In some embodiments, the number of such determined harmonics of the correlation wave that are aliasing into the fundamental correlation waveform can be calculated, since the correlation waveform is known detailed enough in order to determine, which harmonics (mainly) contribute to the cyclic error.

Figure 3:
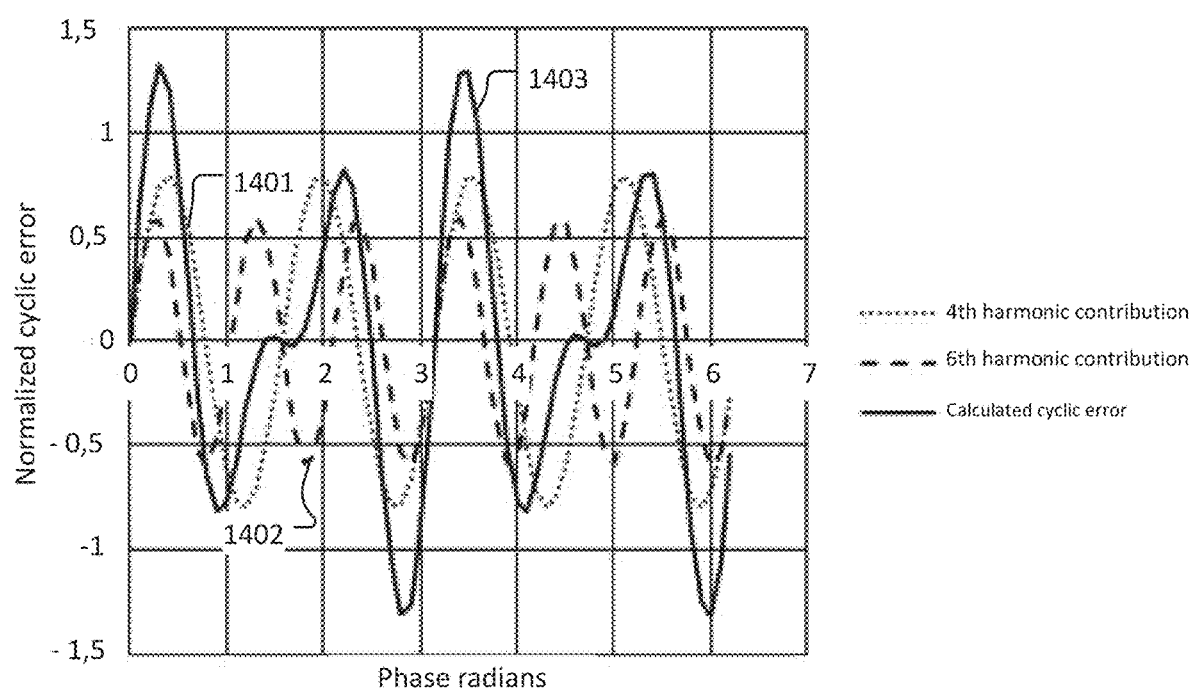
FIG. 3 illustrates an example of the harmonics used to calculate a cyclic error.

This is exemplary illustrated in FIG. 3, which shows, as an example, how different harmonics of the Fourier transformation of the detailed measured correlation waveform contribute to a calculated cyclic error which is assumed to correspond to a cyclic error as discussed in connection with FIG. 2b resulting from the Nyquist Shannon theorem, the influence of which is mathematically known such that the cyclic error can be computed when the "whole" correlation waveform is known (oversampled) (or at least the correlation waveform is known detailed enough such that the cyclic error does at least not occur or only occurs very negligibly). FIG. 3 shows a normalized cyclic error on the ordinate and phase/radians on the abscissa. Line 1401 is the $4^{th}$ harmonic contribution to the cyclic error and line 1402 is the $6^{th}$ harmonic contribution to the cyclic error. Line 1403 shows the calculated cyclic error which is basically sum of the $4^{th}$ harmonic contribution 1401 and the $6^{th}$ harmonic contribution in this concrete example without limiting the present disclosure in that regard. The harmonics involved may vary depending on at least one of the number of components, the pulses profile and duty cycle.

In some embodiments, the first imaging sensor detects light based on a predefined number of phase shifts, which may be four, as discussed above, or any other number, as discussed above. In some embodiments, each phase shift corresponds to one sub-frame and the measurement at all of the predefined number of phase shifts corresponds to one frame, wherein the measured distance is determined based on at least one frame. In some embodiments, during one (or more) frame (or one or more sub-frames), the second image sensor detects light for a large number of phase variations, e.g. reaching from an angle of zero to an angle of 360, e.g. at a predefined step size, which may be freely chosen (e.g. 1, 2, 3 or any integer or real number of degrees). In some embodiments, the phase is also varied continuously.

In some embodiments, the ToF camera further includes an optical shield for shielding the first imaging sensor against light of the predetermined optical path. Thereby, it may be avoided that stray light from the predetermined optical path enters the first imaging sensor.

In some embodiments, the ToF camera further includes a Phase-locked loop, a MXDRIVER, a readout chain and the divider, wherein the divider is configured to divide frequency and generate phase shifts, as discussed above, wherein these components may be on the same die.

Some embodiments pertain to an electronic device including the ToF camera disclosed herein, wherein the electronic device may be a computer, a laptop, a smartphone, a digital (still and/or video) camera, etc.).

Some embodiments, pertain to a calibration method for a time-of-flight camera as discussed herein including performing a time-of-flight measurement calibration based on determining at least one of a cyclic error and an offset error by detecting light emitted from the light source with a second imaging sensor, wherein a predetermined optical path is provided between the light source and the second imaging sensor, as discussed above. The method may further include imaging a scene with the first imaging sensor and simultaneously performing the time-of-flight measurement calibration, as discussed above. The method may further include varying a phase during detecting light emitted from the light source with the second imaging sensor, as discussed above. The first imaging sensor may detect light based on a first number phase shifts, as discussed above. The time-of-flight camera may further include the second imaging sensor and the predetermined optical path, as discussed above.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

FIG. 4 illustrates a first embodiment of a ToF camera 1 for determining a distance "d" to a scene 2.

The ToF camera 1 has a light source 3 (having multiple laser elements), a main imaging sensor 4 (first imaging sensor), second imaging sensor 5, a controller 6 and a predetermined optical path 7 between the light source 3 and the second imaging sensor 5.

The main imaging sensor 4 is a pixel array sensor, based on the CMOS technology (complementary metal oxide semiconductor) and has larger resolution (e.g. 64×64 pixels) as the second imaging sensor 4 (e.g. 10×10 pixels), which is also a pixel array sensor based on the CMOS technology.

The main imaging sensor 4 detects light which is emitted from the light source 3 and reflected by the scene 2.

The second imaging sensor 5 detects light which is emitted from the light source 3 and which travels over the predetermined optical light path 7 to the second imaging sensor 5.

The controller 6 includes electronic components for implementing the readout of the imaging sensor 4 and 5, for controlling the light source 3, for performing the measurement distance and the calibration method discussed herein and has, e.g., a memory, processor, interfaces, etc.

Figure 5:
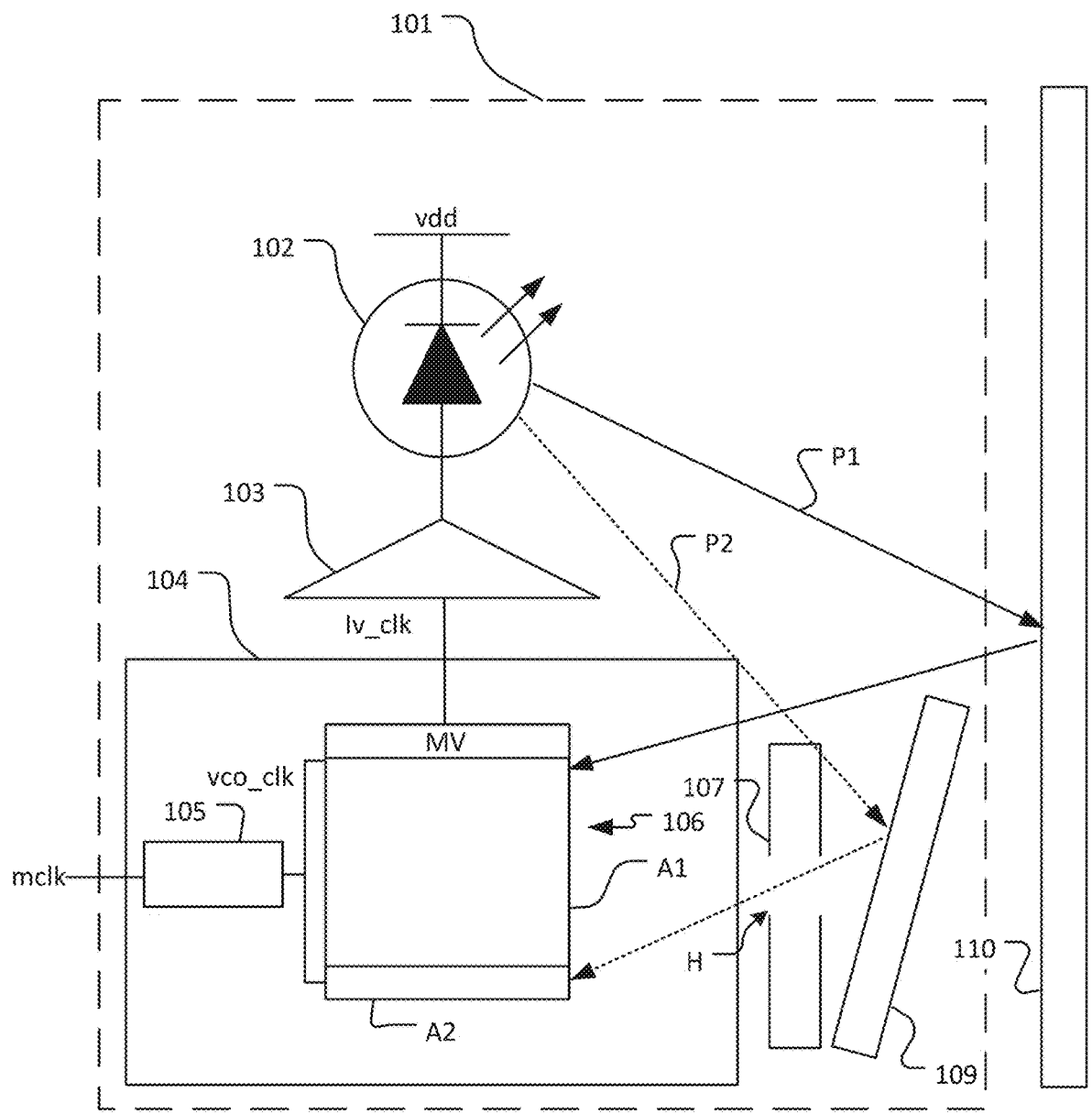
FIG. 5 illustrates a second embodiment of a TOF camera for determining a distance to a scene with a reflector and a common sensor die.

FIG. 5 illustrates a second embodiment of a TOF camera 101 for determining a distance to a scene 110.

The TOF camera 101 has a light source 102, a driver 103, a sensor region 104, a blocking unit 107 and a (fixed) reflector 109.

The light source 102 is an illumination device, which is capable to modulate a frequency and phase and has a couple of laser elements.

The driver 103 is configured to control the light source 102, such as changing the phase of the light signal. The driver 103 receives from the pixel array 106 a laser clock lv_clk to control the phase of the light source 102.

The sensor region 104 has a phase-locked loop 105, a pixel array 106 including a first imaging sensor portion A1 and a second imaging sensor portion A2 and a mix voltage circuit MV, wherein the sensor region 104 and its components 105, 106 and MV are located on the same die.

The fixed reflector 109 reflects light and defines a predetermined optical light path P2 between the light source 102 and the second imaging sensor portion A2. In this embodiment, the fixed reflector 109 is as a part of the TOF camera 101.

A straight arrow line P1 represents an optical path, where light signal emitted by the light source 102 is reflected by the main scene 110 and detected by the first imaging sensor portion A1.

A dotted arrow line P2 represents the predetermined (fixed) optical path, where light emitted by the light source 102 and reflected by the reflector 109 is detected by the second imaging sensor portion A2.

The phase locked-loop 105 is a control system that produces an output signal whose phase is related to the phase of the input signal. Therefore, the phase locked loop 105 receives a master clock mclk and generates the voltage control oscillator clock vco_clk of each pixel of the pixel array 106 to generate a modulation frequency.

A mix voltage MV is applied to the pixel array 106 to drive each pixel in the pixel array 106 and, thus, the first and second imaging portions A1 and A2.

The pixel array 106 is a semiconductor substrate which includes the first imaging sensor portion A1 and the second imaging sensor portion A2.

The second imaging sensor portion A2 has a faster response than the first imaging sensor A1 and has a smaller resolution, and, thus, a size smaller than that of the first imaging sensor portion A1.

The hardware of the second imaging sensor portion A2 is added as extra pixel rows on the same chip as the first imaging sensor portion A1 (while in other embodiments it can be added as a separate chip).

As discussed, while the TOF camera 101 is obtaining depth measurements of the main scene 110, it gets samples of the correlation wave of the fixed known path P2.

The controller determines the distance to the scene 110 and simultaneously a cyclic error and an offset error based on sweeping the phase of the mixing (gating) signal that is used to modulate the pixel response for the distance measurement of the fixed optical path P1, as discussed.

The blocking unit 107 is configured to block the reflected light of the fixed reflector 109 that is entering to the first imaging sensor A1. Further, the blocking unit 107 has a hole structure H that is configured to guide the reflected light to the second imaging sensor A2.

Figure 6:
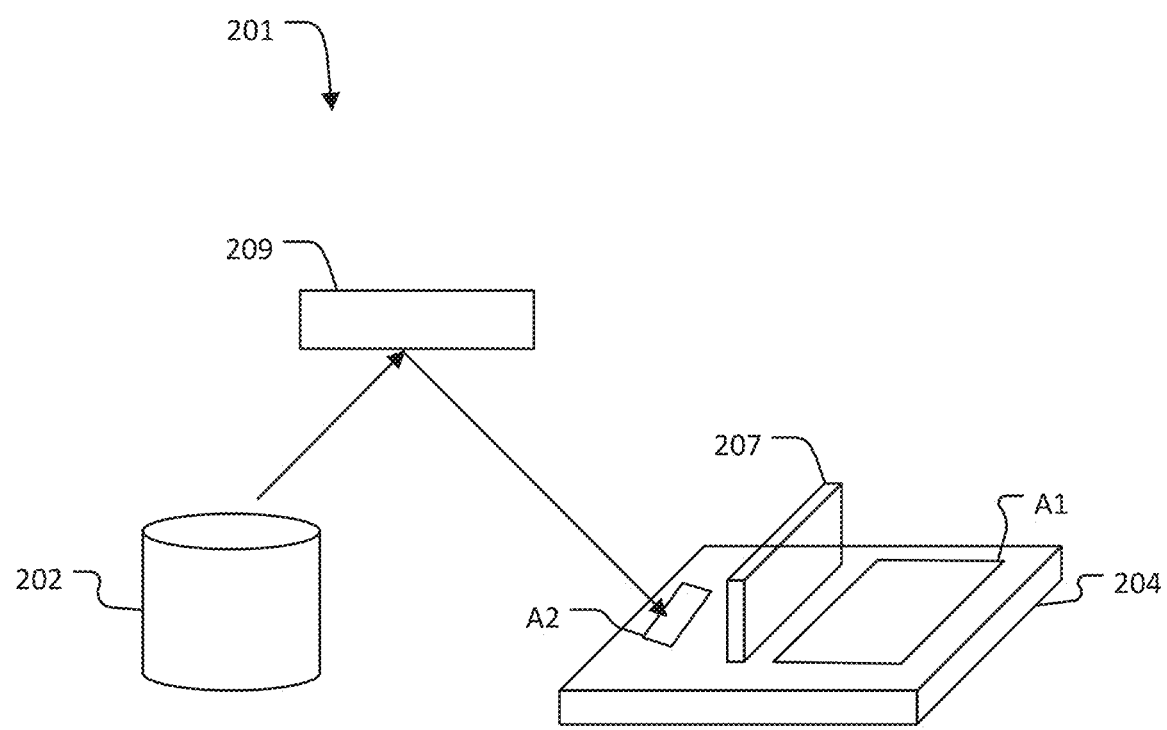
FIG. 6 illustrates a third embodiment of a time-of-flight camera with a reflector and an optical shield.

FIG. 6 illustrates a third embodiment of a time-of-flight camera 201, wherein an optical shield is provided between a first imaging sensor portion A1 and a second imaging sensor portion A2, which are both located on a common sensor portion 204.

Light emitted by a light source 202 of the ToF camera 201 is reflected by a reflector 209, which is part of a predetermined optical path between the light source 202 and the second imaging sensor portion A2, and detected by the second imaging sensor portion A2.

The optical shield 207 prevents that the scattered light of the reflector 209 is invading to the first imaging sensor A1.

Figure 7:
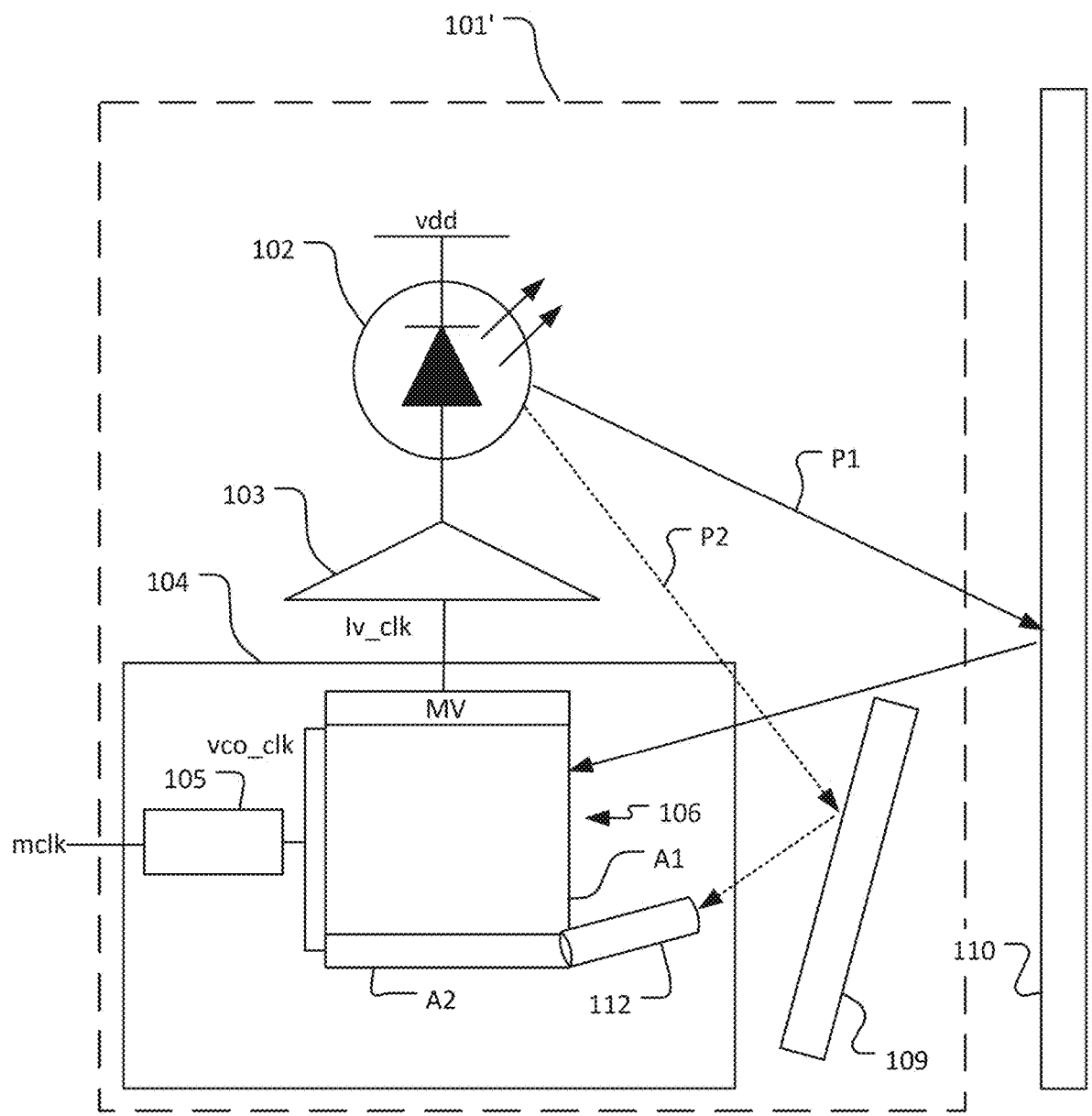
FIG. 7 illustrates another embodiment ToF camera with an optical fiber and a common sensor die.

FIG. 7 illustrates another embodiment of a ToF camera 101' basically corresponding to the ToF camera 101 of FIG. 5 discussed above and having the same components except for that additionally an optical fiber 112 is arranged adjacent to the second imaging sensor portion A2 and between the reflector 109 and the second imaging sensor portion A2. Thereby, light reflected from the reflector 109 enters into the optical fiber 112 and as guided to the second imaging sensor portion A2 without generating stray light which could enter the first imaging sensor portion A1.

Figure 8:
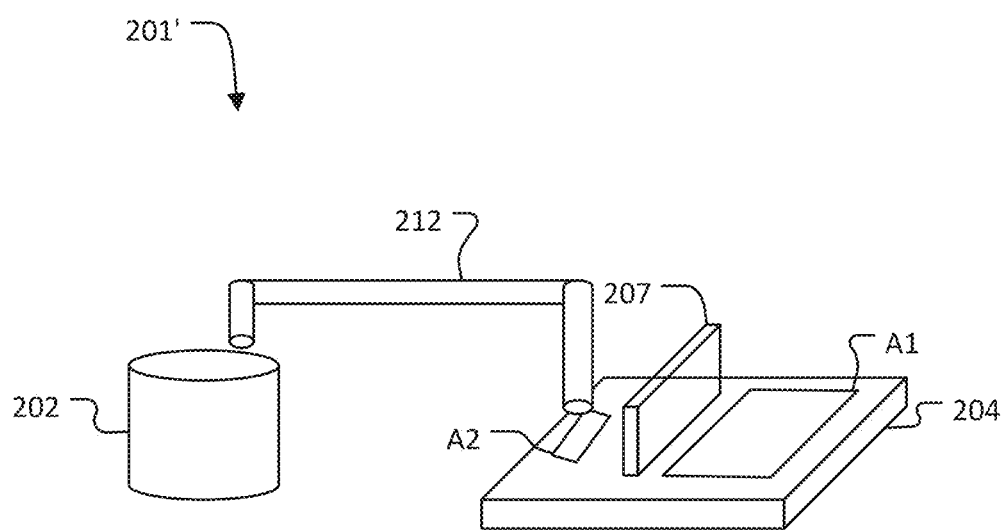
FIG. 8 illustrates another embodiment of a ToF camera with an optical fiber and an optical shield.

FIG. 8 illustrates another embodiment of a time-of-flight camera 201', which basically corresponds to the ToF camera 201 of FIG. 6, wherein the reflector 209 of the ToF camera 201 of FIG. 6 is replaced with an optical fiber 212.

The optical fiber 212 guides light emitted from the light source 202 to the second imaging sensor portion A2.

Figure 9:
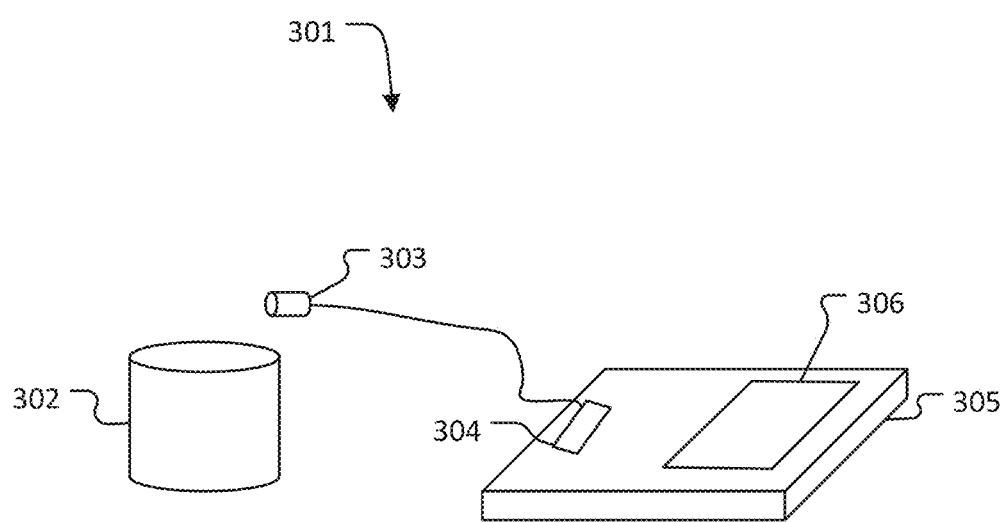
FIG. 9 illustrates another embodiment of a ToF camera, wherein the second imaging sensor is a photodetector.

FIG. 9 illustrates another embodiment of a time-of-flight camera 301 wherein the second imaging sensor is a photodetector 303 which is located adjacent to a light source 302 of the ToF camera 301. The photodetector 303 generates a light detection signal which is transferred to an analog-digital-portion 304 which is arranged on a sensor portion 305 on which also the first imaging sensor 306 is arranged.

Figure 10:
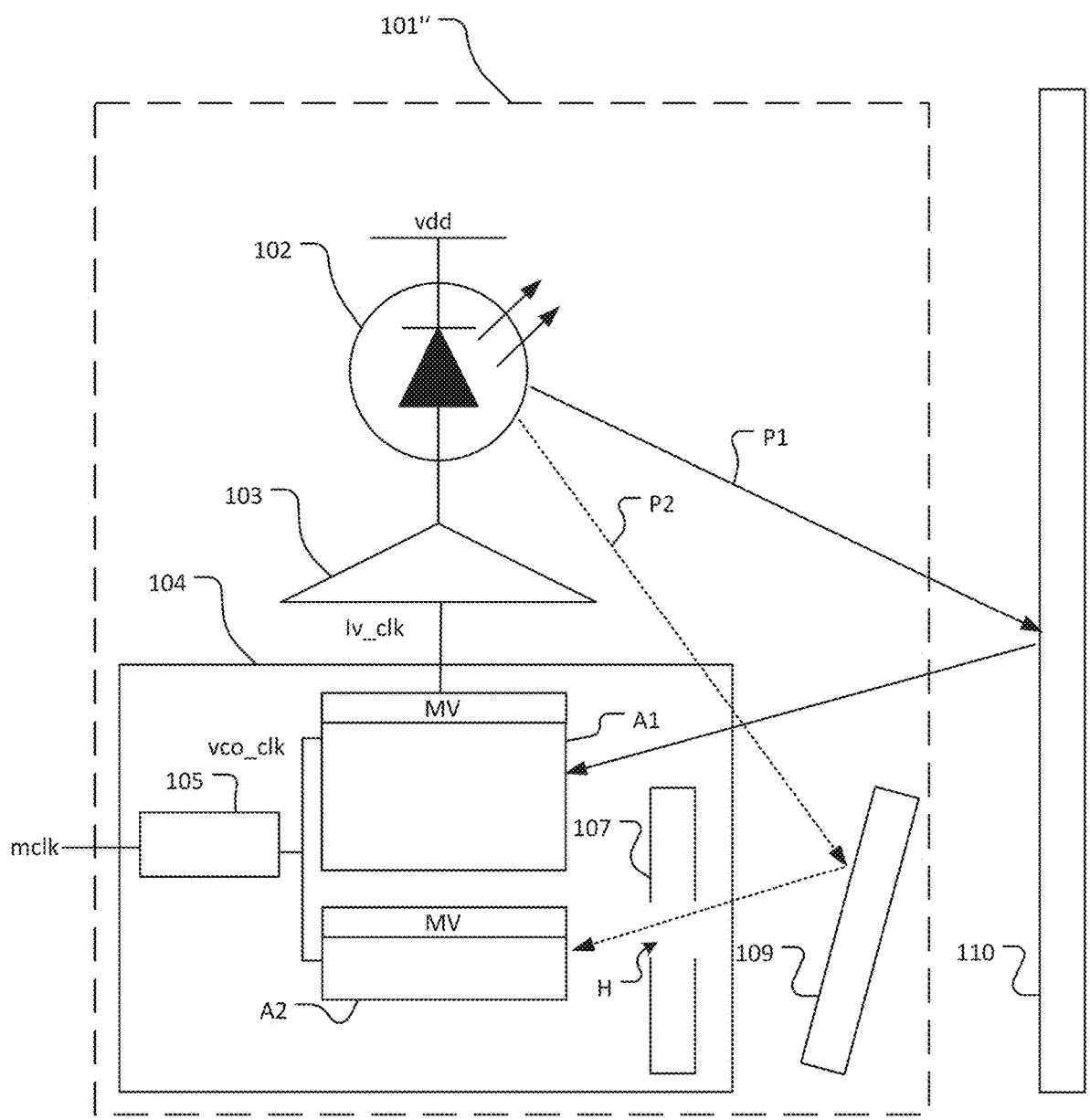
FIG. 10 illustrates another embodiment of a ToF camera, wherein the first and the second imaging sensor portions are arranged as separate portions on the common sensor region.

FIG. 10 illustrates another embodiment of a time-of-flight camera 101" which basically corresponds to the ToF camera 101 of FIG. 5, except for that the first A1 and the second A2 imaging sensor portions are arranged as separate portions on the common sensor region 104 and that each of the first A1 and the second A2 imaging sensor portions has its own mixed voltage circuits MV.

Figure 11:
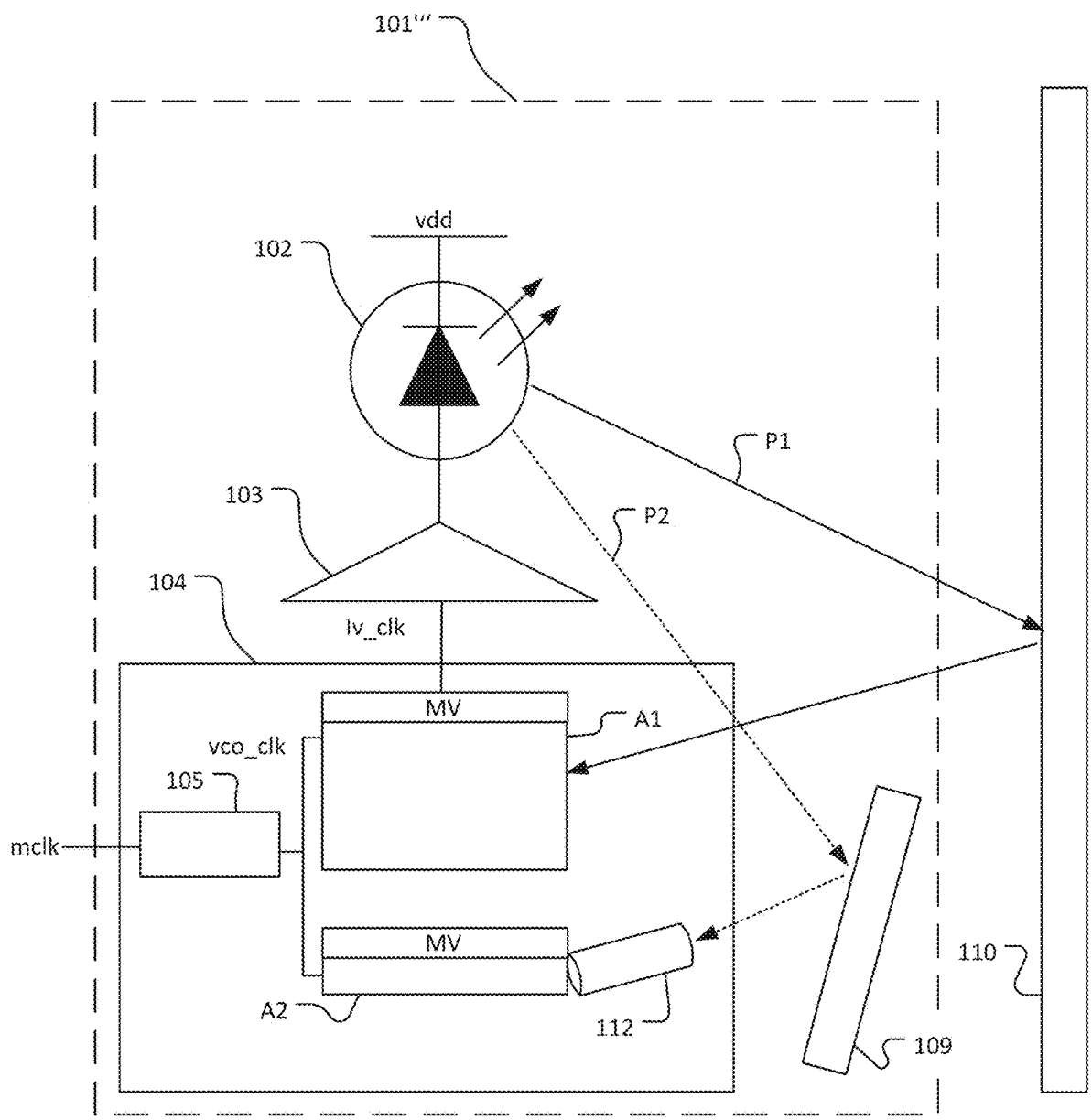
FIG. 11 illustrates another embodiment of a ToF camera with an optical fiber, wherein the first and the second imaging sensor portions are arranged as separate portions on the common sensor region.

FIG. 11 illustrates another embodiment of a time-of-flight camera 101''' which basically corresponds to a combination of the ToF camera 101" of FIG. 10 and the ToF camera 101' of FIG. 7, namely the first A1 and the second A2 imaging sensor portions are arranged as separate portions on the common sensor region 104 and an optical fiber 112 is arranged adjacent to the second imaging sensor portion A2.

Figure 12:
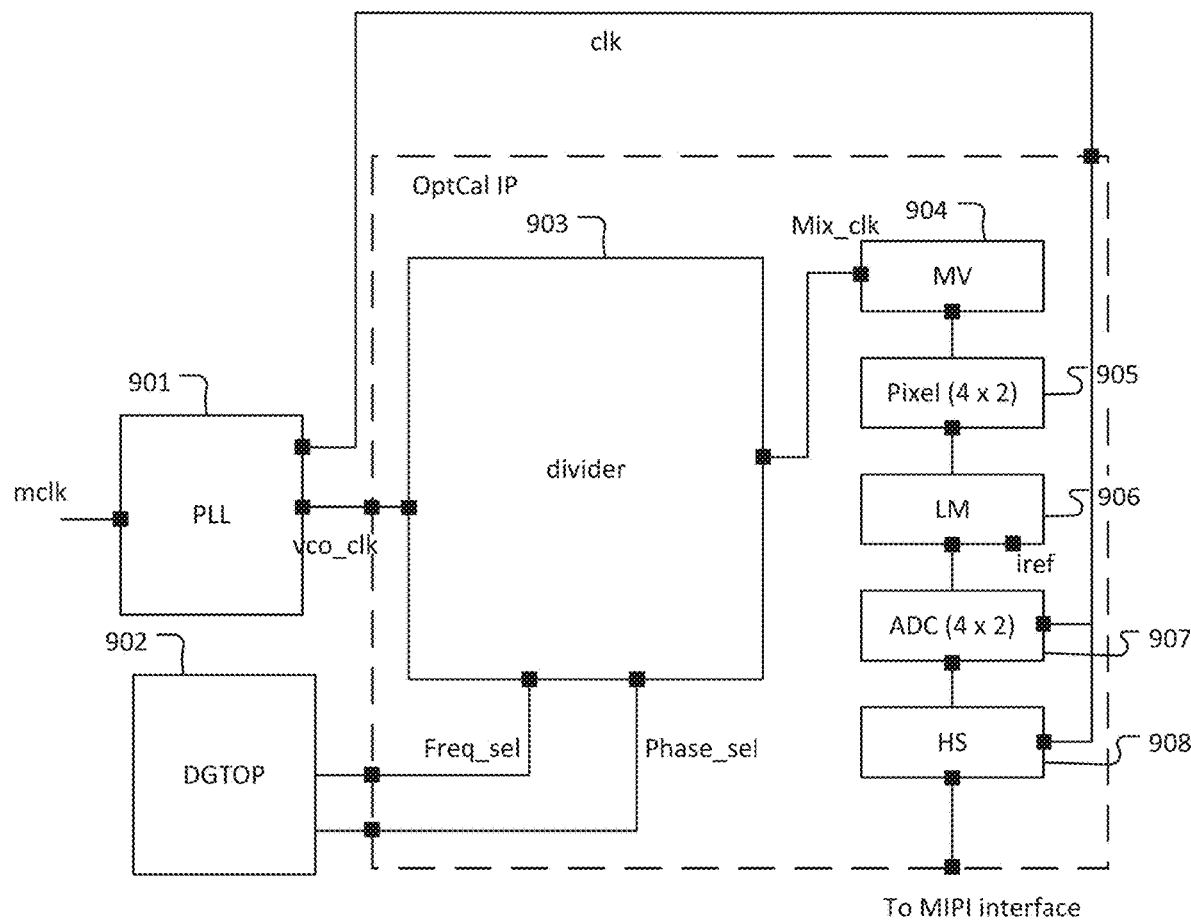
FIG. 12 illustrates an embodiment of a controller which may be implemented in a ToF camera as disclosed and/or which may be integrated in a ToF imaging sensor.

FIG. 12 illustrates an embodiment of a controller 900 which may be implemented in a ToF camera as disclosed herein and/or which may be integrated in a ToF imaging sensor.

The controller 900 has a phase locked-loop 901, a top digital macro DGTOP 902, a divider 903, a mixed voltage circuit MV 904, a pixel array (4×2) 905 representing the second imaging sensor, a load mos LM 906, an analog to digital converter (ADC) 907, which converts the analog signals output from the pixel array 905, and a horizontal scanner HS 908. The DGTOP 902 is a digital control block, which sends digital control signals to the divider 903 in order to set the frequency and phases that the divider needs to generate. The LM 906 is a current source, which is a load mosfet in this embodiment. The HS 908 makes the transition from the parallel ADC output to the serial output of the device. The HS 908 goes through all the channels of the ADC in a sequential way.

The phase locked-loop 901 receives a master clock signals mclk and outputs a vco_clk which is fed to the divider 903, the ADC 907 and the HS 908.

Based on the vco_clk, the divider 902 divides frequency and generates phase sweeps for varying the phases for the second imaging sensor 905, as discussed herein.

Figure 13:
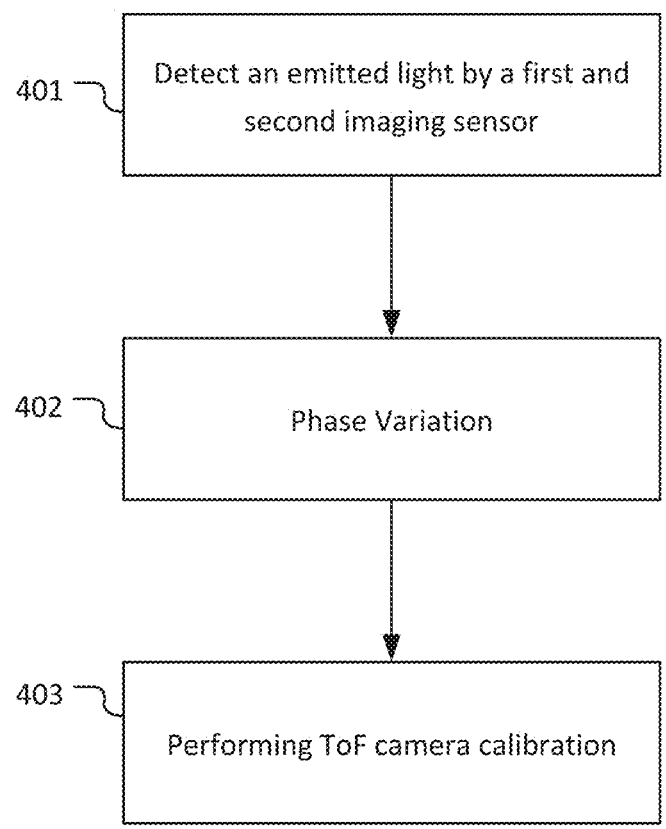
FIG. 13 illustrates a flow chart of a calibration method for a time-of-flight camera.

FIG. 13 illustrates a flow chart of a calibration method 400 for a time-of-flight camera as discussed herein, wherein the calibration method 400 may be performed by a time-of-flight camera or its controller as discussed herein. For illustration purposes, the method 400 will be explained under reference of FIG. 4 without limiting the present disclosure in that regard.

At 401, the scene 2 is imaged with the first imaging sensor 4 and simultaneously light traveling over the predetermined optical path 7 is detected with the second imaging sensor 5.

At 402, a phase is varied during detecting light emitted from the light source with the second imaging sensor, as discussed herein.

At 403, a time-of-flight measurement calibration is performed based on determining a cyclic error and an offset error by detecting light emitted from the light source 3 with the second imaging sensor 5, as discussed herein.

Figure 14:
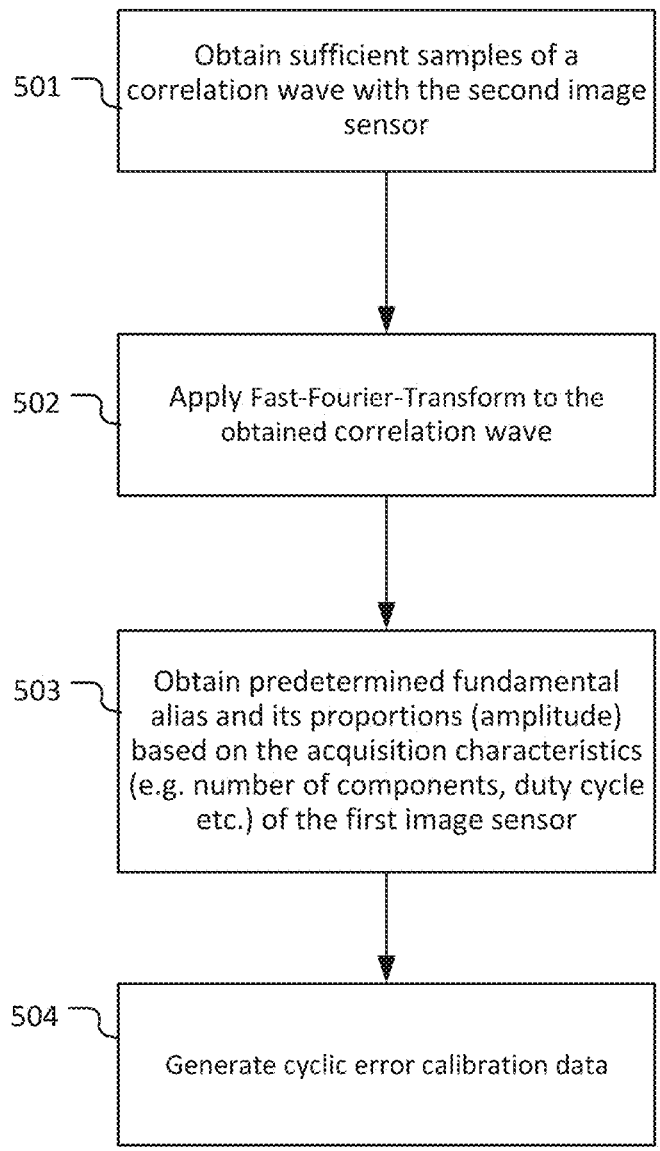
FIG. 14 illustrates a flow chart of a calibration method for determining a cyclic error.

FIG. 14 illustrates a flow chart of a another calibration method 500 for determining a cyclic error of a time-of-flight camera. The calibration method 500 is performed by any time-of-flight camera or its controller as discussed herein. For illustration purposes, the method 500 will be explained under reference of FIG. 4 without limiting the present disclosure in that regard.

At 501, the second image sensor 5 obtains sufficient samples of a correlation wave to overcome aliasing effects according to the Nyquist-Shannon theorem, i.e. the correlation wave is oversampled such that the cyclic error does not occur. Hence, the phase of the modulation wave is swept with sufficient different time delays.

At 502, a Fast-Fourier-Transformation is applied to the sampled correlation wave determined at 501. As the correlation wave is sampled with sufficient sample points it is possible to obtain all or at least enough harmonics of an accurate correlation wave such that the influence of the harmonics of a cyclic error in cases where, for example, the correlation waveform is only measured at four phases can be determined.

At 503, based on the knowledge about the principal ToF sensor on how many sampling points (e.g. four sampling points 0°, 90°, 180°, 270°) are used for sampling the correlation wave for determining the distance, the pulses profiles and duty cycle, the fundamental harmonics and the amplitudes/proportional contribution of the harmonics causing the cyclic error can be determined.

At 504, cyclic error calibration data are determined and generated based on a combination of the fundamental harmonics and their proportional influence on the cyclic error as determined at 503 and they are stored in a lookup table for later use and calibration, e.g. calibrating the first image sensor 4 and the time-of-flight camera (and/or the data obtained with the first image sensor 4) accordingly.

Figure 15:
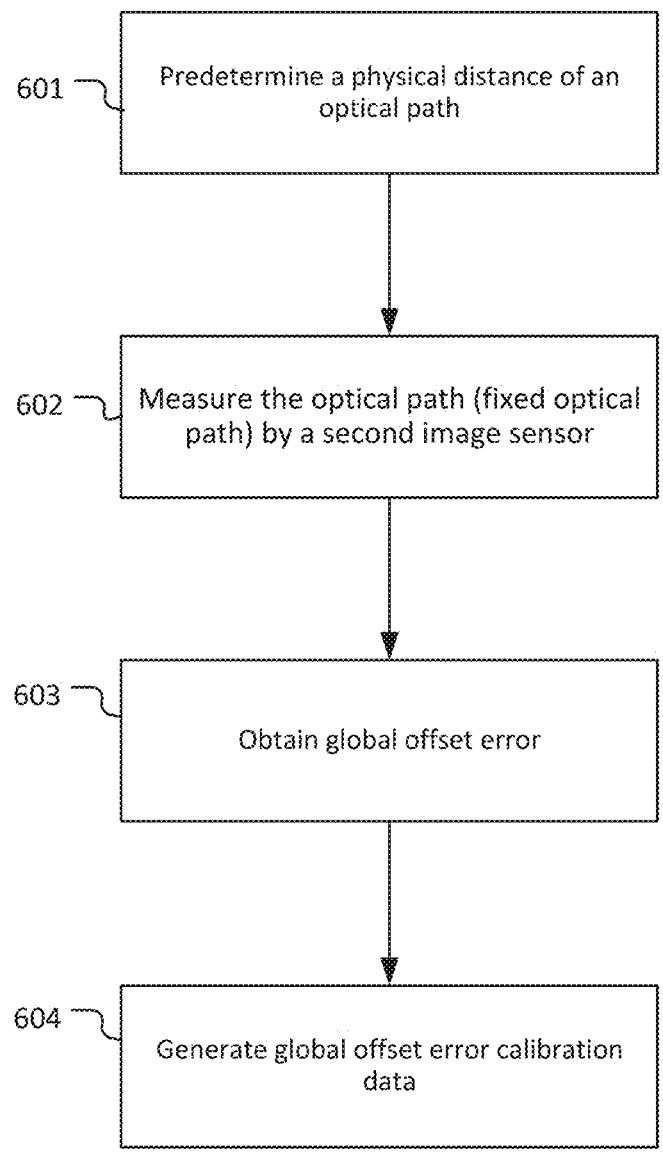
FIG. 15 illustrates a flow chart of a calibration method for determining a global offset error.

FIG. 15 illustrates a flow chart of a calibration method 600 for determining a global offset error of a time-of-flight camera, wherein the calibration method 600 may be performed by any time-of-flight camera or its controller as discussed herein. For illustration purposes, the method 600 will be explained under reference of FIG. 4 without limiting the present disclosure in that regard.

At 601, a physical distance between the light source 3 and the second imaging sensor 5 is predetermined, as discussed above, such that the optical path 7 is predetermined and the distance or length of the optical path through which the light travels from the light source 3 to the second imaging sensor 5 is known (and fixed).

At 602, the optical path 7 is measured by the second image sensor 5 with sufficient samples of the correlation waveform, such that the obtained data may be considered to be (at least nearly) cyclic error free. In some embodiments, for example, the data acquired at 501 of the embodiment of FIG. 14 above may be used. As discussed, the optical path 7 may be a fixed optical path, for example, a hardware part, e.g. a reflector, a fiber, etc., or an external reflector, e.g. a surface of a table.

At step 603, the global offset error is obtained by comparing the predetermined distance between the light source 3 and the second imaging sensor 5 with the distance obtained based on the measurement performed with the second image sensor 5.

At step 604, global offset error calibration data are determined and generated based on the difference between the predetermined and the measured distance obtained at 603 and the global offset error calibration data are stored in a lookup table for later use and calibration, e.g. for calibrating the first image sensor 4 and the time-of-flight camera (and/or the data obtained with the first image sensor 4) accordingly.

Please note that the division of the main sensor 900 into units 901 to 908 is only made for illustration purposes and that the present disclosure is not limited to any specific division of functions in specific units. For instance, the main sensor 904 could be implemented by a respective programmed processor, field programmable gate array (FPGA) and the like.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight camera, comprising:
a light source for emitting light;
a first imaging sensor; and
a controller configured to perform a time-of-flight measurement calibration based on determining at least one of a cyclic error and an offset error by detecting light emitted from the light source with a second imaging sensor, wherein a predetermined optical path is provided between the light source and the second imaging sensor.

(2) The time-of-flight camera of (1), further comprising the second imaging sensor.

(3) The time-of-flight camera of (1) or (2), further comprising the predetermined optical path.

(4) The time-of-flight camera of anyone of (1) to (3), wherein the predetermined optical path includes a reflector.

(5) The time-of-flight camera of anyone of (1) to (4), wherein the predetermined optical path includes an optical fiber.

(6) The time-of-flight camera of anyone of (1) to (5), wherein the controller is further configured to image a scene with the first imaging sensor and simultaneously perform the time-of-flight measurement calibration.

(7) The time-of-flight camera of anyone of (1) to (6), wherein the controller is further configured to vary a phase during detecting light emitted from the light source with the second imaging sensor.

(8) The time-of-flight camera of (7), further comprising a divider configured to vary the phase.

(9) The time-of-flight camera of anyone of (1) to (8), wherein the first imaging sensor detects light based on a predefined number phase shifts.

(10) The time-of-flight camera of anyone of (1) to (9), wherein the second imaging sensor has a smaller resolution than the first imaging sensor.

(11) The time-of-flight camera of anyone of (1) to (10), wherein the second imaging sensor is a part of the first imaging sensor.

(12) The time-of-flight camera of anyone of (1) to (11), wherein the first and the second imaging sensor are located on the same substrate.

(13) The time-of-flight camera of anyone of (1) to (12), further comprises an optical shield for shielding the first imaging sensor against light of the predetermined optical path.

(14) The time-of-flight camera of anyone of (1) to (13), wherein the second imaging sensor is a photo detector.

(15) An electronic device comprising a time-of-flight camera, the time-of-flight camera including:
a light source for emitting light;
a first imaging sensor; and
a controller configured to perform a time-of-flight measurement calibration based on determining at least one of a cyclic error and an offset error by detecting light emitted from the light source with a second imaging sensor, wherein a predetermined optical path is provided between the light source and the second imaging sensor.

(16) A calibration method for a time-of-flight camera, the time-of-flight camera including a light source for emitting light and a first imaging sensor, the method comprising:
performing a time-of-flight measurement calibration based on determining at least one of a cyclic error and an offset error by detecting light emitted from the light source with a second imaging sensor, wherein a predetermined optical path is provided between the light source and the second imaging sensor.

(17) The calibration method of (16), further comprising imaging a scene with the first imaging sensor and simultaneously performing the time-of-flight measurement calibration.

(18) The calibration method of (16) or (17), further comprising varying a phase during detecting light emitted from the light source with the second imaging sensor.

(19) The calibration method of anyone of (16) to (18), wherein the first imaging sensor detects light based on a first number phase shifts and the second image sensor detects light based on a second number of phase shifts, wherein the second number of phase shifts is larger than the first number of phase shifts.

(20) The calibration method of anyone of (16) to (19), wherein the time-of-flight camera further includes the second imaging sensor and the predetermined optical path.

(21) A computer program comprising program code causing a computer to perform the method according to anyone of (16) to (20), when being carried out on a computer.

(22) A non-transitory computer-readable recording medium that stores therein a computer program product, which, when executed by a processor, causes the method according to anyone of (16) to (20) to be performed.

The invention claimed is:

1. A time-of-flight camera, comprising:
a light source configured to emit light;
a first imaging sensor configured to receive reflected light, the reflected light comprising light emitted by the light source and reflected from a scene;
a second imaging sensor configured to receive calibration light from the light source via a predetermined optical path that does not include the scene; and
a controller configured to:
vary a phase of the light emitted by the light source;
vary a phase of a light sampling signal configured to control readout, from the second imaging sensor, of information indicative of a phase shift of the light emitted by the light source resulting, at least in part, from the phase of the light being varied;
determine, using the information indicative of a phase shift, a cyclic error and/or an offset error; and
perform a time-of-flight measurement calibration using the cyclic error and/or the offset error.

2. The time-of-flight camera of claim 1, further comprising a reflector, the reflector being disposed to provide the predetermined optical path between the light source and the second imaging sensor.

3. The time-of-flight camera of claim 1, further comprising an optical fiber, the optical fiber configured to guide light from the light source to the second imaging sensor thereby providing the predetermined optical path.

4. The time-of-flight camera of claim 1, wherein the controller is further configured to image the scene with the first imaging sensor and simultaneously perform the time-of-flight measurement calibration.

5. The time-of-flight camera of claim 1, further comprising a divider configured to vary the phase of the light sampling signal.

6. The time-of-flight camera of claim 1, wherein the first imaging sensor detects light based on a predefined number of phase shifts.

7. The time-of-flight camera of claim 1, wherein the second imaging sensor has a smaller resolution than the first imaging sensor.

8. The time-of-flight camera of claim 1, wherein the second imaging sensor is a part of the first imaging sensor.

9. The time-of-flight camera of claim 1, wherein the first and the second imaging sensors are located on the same substrate.

10. The time-of-flight camera of claim 1, further comprising an optical shield for shielding the first imaging sensor against light of the predetermined optical path.

11. The time-of-flight camera of claim 1, wherein the second imaging sensor is a photo detector.

12. An electronic device comprising a time-of-flight camera, the time-of-flight camera including:
a light source configured to emit light;
a first imaging sensor configured to receive reflected light, the reflected light comprising light emitted by the light source and reflected from a scene;
a second imaging sensor configured to receive calibration light from the light source via a predetermined optical path that does not include the scene; and
a controller configured to:
vary a phase of the light emitted by the light source;
vary a phase of a light sampling signal configured to control readout, from the second imaging sensor, of information indicative of a phase shift of the light emitted by the light source resulting, at least in part, from the phase of the light being varied;
determine, using the information indicative of a phase shift, a cyclic error and/or an offset error; and
perform a time-of-flight measurement calibration using the cyclic error and/or the offset error.

13. A calibration method for a time-of-flight camera, the time-of-flight camera including a light source for emitting light, a first imaging sensor, and a second imaging sensor, the method comprising:

receiving, by the first imaging sensor, reflected light, the reflected light comprising light emitted by the light source and reflected from a scene;

receiving, by the second imaging sensor, calibration light from the light source via a predetermined optical path that does not include the scene;

varying a phase of light emitted by the light source;

varying a phase of a light sampling signal to control readout, from the second imaging sensor, of information indicative of a phase shift of the light emitted by the light source resulting, at least in part, from the phase of the light being varied;

determining, using the information indicative of a phase shift, a cyclic error and/or an offset error; and performing a time-of-flight measurement calibration using the cyclic error and/or the offset error.

14. The calibration method of claim 13, further comprising imaging the scene with the first imaging sensor and simultaneously performing the time-of-flight measurement calibration.

15. The calibration method of claim 13, wherein the first imaging sensor detects light based on a first number phase shifts and the second image sensor detects light based on a second number of phase shifts, wherein the second number of phase shifts is larger than the first number of phase shifts.

16. The electronic device of claim 12, wherein the controller is further configured to image the scene with the first imaging sensor and simultaneously perform the time-of-flight measurement calibration.

17. A time-of-flight camera, comprising:
a light source configured to emit light;
a first imaging sensor; and
a controller configured to:
  vary a phase of the light emitted by the light source;
  vary a phase of a light sampling signal configured to control readout, from a second imaging sensor, of information indicative of a phase shift of the light emitted by the light source resulting, at least in part, from the phase of the light being varied;
  determine, using the information indicative of a phase shift, a cyclic error and/or an offset error; and
  perform a time-of-flight measurement calibration using the cyclic error and/or the offset error,
wherein the controller is configured to determine the cyclic error and/or the offset error by:
  obtaining samples of a correlation waveform by performing a cross-correlation between the varied phase of the light emitted by the light source and the information indicative of a phase shift;
  applying a fast Fourier transform to the samples of the correlation waveform; and
  determining the cyclic error and/or the offset error based, at least in part, part on an output of the fast Fourier transform.

* * * * *